(No Model.)
J. CHASE.
SPROCKET WHEEL.
No. 394,335. Patented Dec. 11, 1888.
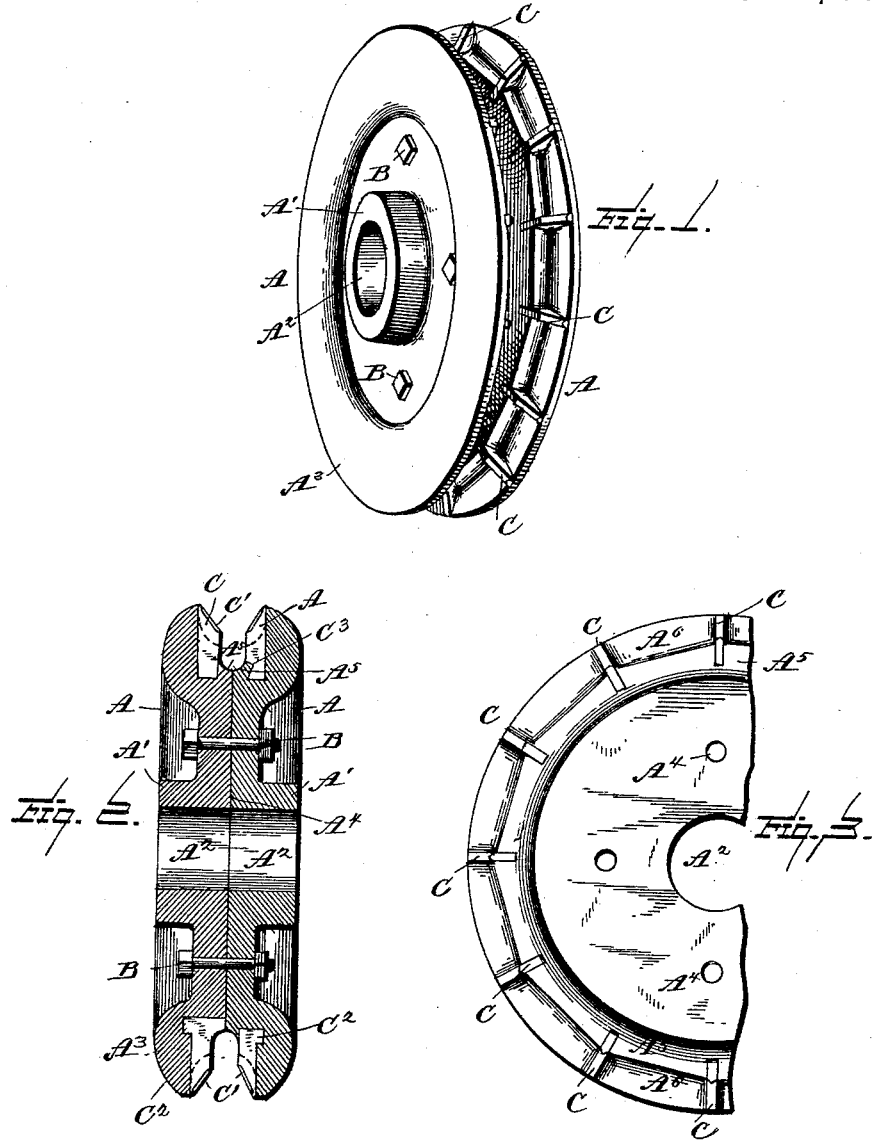
Witnesses
J. H. Hall
W. S. Duvall
Inventor.
Jefferson Chase.
E. B. Stocking
Attorney.

UNITED STATES PATENT OFFICE.

JEFFERSON CHASE, OF PORTLAND, MAINE, ASSIGNOR TO CHASE & SON, OF SAME PLACE.

SPROCKET-WHEEL.

SPECIFICATION forming part of Letters Patent No. 394,335, dated December 11, 1888.

Application filed August 6, 1888. Serial No. 282,045. (No model.)

*To all whom it may concern:*

Be it known that I, JEFFERSON CHASE, a citizen of the United States, residing at Portland, in the county of Cumberland, State of Maine, have invented certain new and useful Improvements in Sprocket-Wheels, of which the following is a specification, reference being had therein to the accompanying drawings.

This invention has relation to sprocket-wheels, and has for its object a construction which will permit of the provision of steel teeth for the same and yet permit of access to the parts of the wheel for finishing purposes, whereby the article when completed shall be compact, serviceable, and adapted to be manufactured at a minimum cost.

Other objects and advantages of the invention will hereinafter be described, and the novel features thereof will be particularly pointed out in the claim.

Referring to the drawings, Figure 1 is a perspective, Fig. 2 a vertical transverse section, and Fig. 3 a partial side elevation, of one of the two parts of the wheel.

Like letters refer to like parts in all the figures.

The wheel comprises two cast sections, A A, each of which is provided with a hub, A', which is bored, as at $A^2$, for the reception of a shaft or spindle. Each section is bound by a thick annular rim, $A^3$, and is perforated between the hub and rim for the passage of bolts B. The inner face, $A^4$, of each section is preferably flat, being produced either in the casting or by any desired manner of planing, grinding, or otherwise truing the same. Said inner face terminates in and is bounded by a quarter-circle groove, $A^5$, from the outer edge of which the section terminates in and is bounded by a portion of a groove, $A^6$, of a radius greater than that of the groove $A^5$.

At desired intervals along the grooves $A^5$ $A^6$ there are inserted steel teeth C, around which the metal constituting the section A is cast—that is to say, all portions of each tooth which are exposed in use project from the section. Each of the teeth may be a plain bar of steel beveled at one end, as at C', while at the other it may be extended in any direction to form a projection, $C^2$, or it may be notched, as at $C^3$, so that when in any manner it is provided with projections or notches the metal of the casting will set around the teeth and thus further a permanent solid connection of the teeth and the section.

After the sections are cast and squared up on their faces $A^4$, the bolt-holes, if not produced in the process of casting, may be bored, and the two sections may then be bolted together, when the hub portion of the wheel may be bored or reamed to the desired size, and the wheel then mounted on a mandrel, and the quarter-grooves $A^5$ turned or otherwise brought to a true circle about the center of the bore. At the same time, if necessary or desirable, the inner edges of the teeth may be trued.

It is apparent that in use the links of the sprocket-chain employed in connection with a wheel of this construction will take draft against the steel or other hard-metal teeth employed, thus increasing the life of the wheel far beyond one in which the teeth are formed of cast-iron.

I am aware that it is customary to substitute harder metals for softer in parts of machinery subjected to a greater wear than remaining parts, and I do not claim, broadly, such a substitution of material as of my invention. In this case not only are the actual working-faces of the teeth of a sprocket-wheel of a harder or more serviceable material, but said teeth are so located that their inner edges, as well as their working faces or sides, project from the softer metal in which they are embedded, so that the actual chain-groove of the wheel—that is, the two quarter-grooves $A^5$—are strengthened against wear at all points in the periphery of the wheel where the teeth are located.

What I claim is—

A sprocket-wheel made in sections, each having at one side a hub and rim and at the other side a plain face, a quarter-groove, and embedded steel teeth, substantially as specified.

In testimony whereof I affix my signature in presence of two witnesses.

JEFFERSON CHASE.

Witnesses:
 PHILIP W. HUSTON,
 FRED. M. HARMON.